United States Patent
Drane et al.

(10) Patent No.: US 6,275,705 B1
(45) Date of Patent: Aug. 14, 2001

(54) LOCATION AND TRACKING SYSTEM

(75) Inventors: Christopher R. Drane, Kuringai; Malcolm D. MacNaughtan, Panamatta; Craig A. Scott, St. George, all of (AU)

(73) Assignee: Cambridge Positioning Systems Ltd., Cambridge (GB)

( * ) Notice: Subject to any disclaimer, the term of this patent is extended or adjusted under 35 U.S.C. 154(b) by 0 days.

(21) Appl. No.: 09/091,728

(22) PCT Filed: Dec. 23, 1996

(86) PCT No.: PCT/AU96/00832

§ 371 Date: Nov. 27, 1998

§ 102(e) Date: Nov. 27, 1998

(87) PCT Pub. No.: WO97/23785

PCT Pub. Date: Jul. 3, 1997

(30) Foreign Application Priority Data

Dec. 22, 1995 (AU) .................................................. PN 7333

(51) Int. Cl.⁷ ...................................................... H04Q 7/20
(52) U.S. Cl. ........................ 455/456; 455/65; 342/357.08; 342/450
(58) Field of Search ...................... 455/456, 65; 342/372, 342/457, 107, 357.08, 450, 417, 429, 432, 446

(56) References Cited

U.S. PATENT DOCUMENTS

| | | | |
|---|---|---|---|
| 3,787,862 | * 1/1974 | Jacobson | 342/418 |
| 3,848,254 | * 11/1974 | Drebinger et al. | 342/457 |
| 4,799,062 | * 1/1989 | Sanderford, Jr. et al. | 342/450 |
| 4,975,710 | 12/1990 | Baghdady | 342/442 |
| 5,017,926 | 5/1991 | Ames et al. | 342/353 |
| 5,128,925 | 7/1992 | Dornstetter et al. | 370/17 |
| 5,208,756 | * 5/1993 | Song | 455/456 |
| 5,317,323 | 5/1994 | Kennedy et al. | 342/457 |
| 5,327,144 | 7/1994 | Stilp et al. | 342/387 |
| 5,359,332 | 10/1994 | Allison et al. | 342/357 |
| 5,365,516 | 11/1994 | Jandrell | 370/18 |

(List continued on next page.)

FOREIGN PATENT DOCUMENTS

| | | | |
|---|---|---|---|
| 0038151A1 | 10/1981 | (EP) | G01S/1/16 |
| 0672917A1 | 9/1995 | (FR) | G01S/5/10 |
| 2260050A | 3/1993 | (GB) | H04Q/7/04 |
| 2264837A | 9/1993 | (GB) | G01S/5/14 |
| 07181242A | 7/1995 | (JP) | G01S/5/10 |
| WO9304453 | 3/1993 | (WO) | G08G/1/127 |
| WO9614588 | 5/1996 | (WO) | G01S/5/02 |
| WO9621162 | 7/1996 | (WO) | G01S/5/02 |
| WO9621332 | 7/1996 | (WO) | H04Q/7/38 |
| WO9625830 | 8/1996 | (WO) | H04Q/7/38 |
| WO9723785 | 7/1997 | (WO) | G01S/5/10 |

*Primary Examiner*—Lee Nguyen
(74) *Attorney, Agent, or Firm*—Roylance, Abrams, Berdo & Goodman, LLP

(57) ABSTRACT

The invention concerns a method of finding the position of a mobile radio-frequency transceiver in a communications system. A network of at least two unsynchronized base stations arranged to transmit/receive signals to at least one mobile-radio frequency transceiver; a reference receiver located at a known distance from the base stations and including measuring means to measure the times of arrival of signals transmitted from the base stations; determination means to use the known distances and measured times to determine the relative time offsets of transmissions from each base station; and location means to use the determined relative time offsets to calculate the position of a mobile transceiver in the network area using hyperbolic positioning techniques. A number of other enhancements to positioning systems relating to the usage of Doppler, carrier information, direction of arrival to improve the performance of mobile telephone-based positioning systems are also described.

6 Claims, 1 Drawing Sheet

U.S. PATENT DOCUMENTS

| | | | |
|---|---|---|---|
| 5,465,289 | 11/1995 | Kennedy, Jr. | 379/59 |
| 5,519,760 | 5/1996 | Borkowski et al. | 379/59 |
| 5,526,357 | 6/1996 | Jandrell | 370/95.2 |
| 5,534,876 | 7/1996 | Erickson et al. | 342/387 |
| 5,559,864 | 9/1996 | Kennedy, Jr. | 379/59 |
| 5,570,094 * | 10/1996 | Armstrong | 342/107 |
| 5,592,180 | 1/1997 | Yokev et al. | 342/450 |
| 5,592,181 | 1/1997 | Cai et al. | 342/457 |
| 5,596,330 | 1/1997 | Yokev et al. | 342/387 |
| 5,600,706 | 2/1997 | Dunn et al. | 379/59 |
| 5,629,710 | 5/1997 | Sawada | 342/457 |
| 5,680,142 * | 10/1997 | Smith et al. | 342/372 |
| 5,859,612 * | 1/1999 | Gilhousen | 342/457 |
| 5,917,449 * | 6/1999 | Sanderford et al. | 342/457 |

* cited by examiner

LOCATION AND TRACKING SYSTEM

FIELD OF THE INVENTION

The present invention relates to mobile radio-frequency communication systems, and in particular to improvements in positioning and tracking systems for mobile radio-frequency transceivers such as cellular telephones. In a further aspect the invention concerns a method of finding the position of a mobile radio-frequency transceiver in a communications system.

BACKGROUND ART

Two important concepts in understanding the modes of operation of a positioning system are "remote-positioning" and "self-positioning". In remote-positioning, a central station works out the location of the mobile. In self-positioning, the mobile works out its own location using data supplied by the station.

Two important modes of operation are radial remote-positioning and hyperbolic self-positioning.

Radial remote-positioning uses measurements of round trip time between a number of base stations and a mobile telephone. The distance between each base station and the mobile telephone can then be calculated by using the fact that radio waves propagate at the speed of light. There are a number of ways of measuring the round trip time, one way being the standard timing advance measurements made by base stations operating with the Global System Mobile (GSM) mobile telephony standard.

In operation the time-delay measurements from two base stations are transmitted via a radio link or fixed communication lines to a central station. From the time delays distances can be calculated, and using the distances it is possible to generate circles corresponding to loci of possible positions. The intersection of these loci establishes the position of the mobile telephone. There are two possible intersection points. Any ambiguity can be often resolved from a priori information. If this is not possible, a measurement from a third base station will resolve the issue. The third measurement will also allow a higher level of accuracy for the position measurement. Measurements from more than three base stations can also be combined, using standard techniques, to give more accurate measurements.

In the hyperbolic self-positioning system, the mobile telephone will compare the time of arrival of signals from three different base stations. The difference in time of arrival from two of the base stations will define one hyperbola, the time difference between another pair of stations will generate another hyperbola. The intersection of the two hyperbolas will define the location of the mobile telephone. In some cases there will be two intersections raising possible ambiguity. This can be resolved by the use of a fourth base station. This fourth base station will also allow a higher level of accuracy for the position measurement. Measurements from more than four base stations can also be combined to give more accurate measurements.

A combination of other modes is also possible. For example the round trip times could be measured at the mobile, so producing a radial self-positioning system. Alternatively the round trip time measurements could be made at the base stations, but sent to the mobile, which would then make the position calculations; an indirect radial self-positioning system. Alternatively, the base stations could co-operate to measure the time difference of arrival of the signals from a single mobile; a direct remote hyperbolic positioning system.

There are many possible uses for a system that allows accurate location of mobile telephones. These include locating people who are in distress, efficient dispatching of fleets, providing navigational guidance, recovery of stolen telephones, and giving geographically referenced information such as the location of the nearest restaurant. There have already been some attempts at implementation of systems for locating mobile phones. However, as yet there has not been a widespread commercial implementation. The major reason for this is that current solutions have technical deficiencies in the areas of coverage, accuracy, and cost.

DISCLOSURE OF THE INVENTION

In a first aspect the invention provides a mobile radio-frequency communications system, comprising: a network of at least two base stations arranged to transmit/receive signals to at least one mobile radio-frequency transceiver; a reference receiver located at a known distance from the base stations and including measuring means to measure the times of arrival of signals transmitted from the base stations; determination means to use the known distances and measured times to determine the relative time offsets of transmissions from each base station; and location means to use the determined relative time offsets to calculate the position of a mobile transceiver in the network area using hyperbolic positioning techniques.

The invention may be applied to any communications system that uses multiple sites, including cellular telephone systems, personal communications systems, and orbiting mobile telephone systems. It is an advantage of at least some embodiments of the invention to improve the accuracy and coverage, and reduce the cost of locating mobile telephones. Another advantage is the small number of changes required to a cellular system in order to implement some embodiments of the invention.

The position information could be derived remotely by the network or locally by the mobile transceivers.

Such a system could measure the actual propagation time of the signal transmitted from each base station to the reference receiver, compare the actual propagation time with a reference propagation time, and provide the selected mobile transceivers with time-difference measurements. The time difference measurements may include differences introduced by synchronisation errors, and by propagation delays.

Alternatively, the reference radio-frequency receiver may include signal processing means to measure the actual propagation time of the signal transmitted from each base station to the reference receiver and compare the actual propagation time with a reference propagation time. The reference receiver may also communicate the time difference measurements to a control means through its nearest base station, and the control means in turn could forward the time-difference measurements to the base stations for transmission to the selected receivers. In this case the determination means may be situated within the reference receiver, in which case the reference receiver transmits the relative time offsets back to the system.

In a self-positioning system the location means may be situated within the mobile transceiver. Alternatively, in a remote positioning system the location means may be associated with a central site remote from the mobile. For a remote system, the central station could use the information derived from the reference receiver in order to make the position determination.

The location means may receive information from the reference receiver by means of a landline rather than by means of a broadcast transmission. The location means may also receive data concerning at least one of base station oscillator stability, basestation location or the phase difference between two signals having different frequencies that have been transmitted by the same base station, by means of the landline.

Only a parameter of the signal (the epoch difference) needs to be transmitted, to the whole signal which is bandwidth efficient, and also means that it is not essential to compare exactly the same epochs. In many applications, the use of a reference receiver is more efficient, as it does not detract from system capacity and can be set up without any modification to the infrastructure of the cellular system.

A selector means may be operationally associated with the determination means to selectively prevent information concerning the position of a mobile transceiver from being available to that receiver. The base stations or the transceivers, or both, may be modified to ensure that only selected transceivers have available the position information. Non-selected transceivers may still be able to use the system to communicate, but will either not have the position information available to them, or will have position information of lesser accuracy than is available to the selected transceivers. The selected transceivers could include a decoding algorithm that allows only those mobile transceivers to use the time-difference measurements supplied by the system and so calculate their position.

In circumstances where not all the base stations in a system can be seen from one reference receiver, several reference receivers could be used. Provided there is an overlap between the base stations seen by the reference receivers it may be possible to achieve system wide synchronisation.

In a second aspect the mobile transceiver calculates the phase difference between at least two signals having different frequencies that have been transmitted from the same base station in order to calculate its position. The network in this aspect can be a synchronised or a non-synchronised network.

Both the mobile and reference radio-frequency receivers and the basestations may be multi-channel receivers of the type having a timing reference circuit under the control of a processing means. Alternatively, a single channel receiver may be employed which is switchable between the different frequencies used by the base stations in the network.

The system can also include a means of accounting for the distortion to signals transmitted between the base station and the mobile or reference receiver caused by multi-path reflections. Such reflections are typically caused by buildings and other objects common in urban and suburban areas.

In a preferred arrangement, the process for rejecting signals that have undergone multi-path reflections includes using the estimate of the impulse response from the equaliser of the mobile telephone and using this estimate of the impulse response to reject the multipath reflections and other channel induced errors. This has the advantage of reducing the processing load of the mobile telephone by reusing the equaliser information, so reducing cost, complexity, and power drain.

In a third aspect the invention provides a mobile radio-frequency communication system, comprising: a network of at least three base stations each arranged to transmit/receive signals to/from at least one mobile radio-frequency transceiver; wherein the transceiver(s) calculates the impulse response of the channel and uses this information to reduce multi-path effects.

When a mobile transceiver is moving relative to the base stations, such as when placed in a moving vehicle, it is possible to use the movement of the vehicle to produce a synthetic antenna aperture such an aperture may have a width of many wavelengths. In one embodiment of the present invention, such a synthetic aperture could be used for multi-path rejection by steering the antenna towards the base station. An added source of position information can also be derived from the synthetic aperture by determining the angle of arrival of the signal. The synthetic antenna aperture may provide better signal to noise performance. The MUSIC signal processing algorithm could also be used for processing of the data from this synthetic aperture to improve performance.

In one embodiment of this aspect, any signals arriving at the mobile transceiver that have undergone multi-path reflections are subtracted from the first direct signal to be received using a Fourier transform equalisation technique.

In a fourth aspect the invention provides a mobile radio-frequency communication system, comprising: a network of at least three base stations each arranged to transmit signals to at least one mobile radio-frequency transceiver; wherein the mobile transceiver synthesises a wide aperture while it is moving to provide additional information for position calculation.

In a fifth aspect the invention provides a mobile radio-frequency communication system, comprising: a network of at least three base stations each arranged to transmit signals to at least one mobile radio-frequency transceiver; wherein the mobile transceiver synthesises a wide aperture while it is moving to provide additional information to reduce multi-path effects.

It would also be possible to use directional antennas, both on the mobile transceiver and each of the base stations, to improve multi-path performance, resolve ambiguity and increase accuracy. Another option could be to use adaptive beam forming to null interferers, such as multi-path signals.

In urban areas, there will commonly be many other radio sources such as commercial radio stations, television stations and analogue mobile telephone services. An advanced receiver could integrate information from all these sources to provide even better position estimates.

In a sixth aspect the invention provides a mobile radio-frequency communication system, comprising: a network of at least two base stations each arranged to transmit/receive signals to at least one mobile radio-frequency transceiver; wherein a directional antenna is used for position ambiguity resolution, position determination or to reduce multi-path effects.

In a seventh aspect the invention provides a mobile radio-frequency communication system, comprising: a network of at least three base stations each arranged to transmit or receive signals to/from at least one mobile radio-frequency transceiver; wherein Doppler estimates of the velocity of mobile transceivers are used to calculate the velocity of the mobiles.

This velocity information could be used in various ways including improving position information by means of an integrating filter (eg Kalman filter). Because the mobile will often be frequency locked to one of the basestations, the conventional means of velocity estimation will give incorrect estimates.

In an eighth aspect the invention provides a mobile radio-frequency communication system, comprising: a network of at least three base stations each arranged to transmit or receive signals to/from at least one mobile radio-frequency transceiver; wherein information such as map data, dead reckoning, communications broadcasts are used to improve mobile transceiver position estimates.

It would also be possible to integrate a map display with the position data developed by the invention and to use map aided positioning techniques so that the position of the mobile transceiver could be overlaid on a map to allow ready determination of position.

Even with a large number of base stations within a city, there will be some regions where a position measurement will be difficult or not possible. One means of overcoming this difficulty could involve the use of a low cost dead reckoning sensor, such as a compass, integrated into the system.

In the network, each base station can operate with a number of carrier frequencies. In most situations, it would also be possible for any one mobile transceiver to be within transmission range of more than three base stations. As a result, there will be a considerable amount of redundant carrier phase information available, which can be used to improve the accuracy of the system. For example, as Kalman filtering could be applied to the phase and time of arrival information in order to produce optimal filtering of the positioning data. The major advantage of such filtering is that it could be used to refine position estimates even when the mobile transceiver was moving.

The use of differential information derived from a reference receiver could also be used to significantly increase the accuracy of the location of the mobile transceiver.

In a ninth aspect the invention provides a method of finding the position of a mobile radio-frequency transceiver in a mobile radio-frequency communication system comprising a network of at least three base stations arranged to transmit signals, the method comprising the steps of: locating a reference receiver at known distances from the base stations; measuring the times of arrival of signals transmitted from the base stations; determining the relative time offsets of transmissions from each base station, using the known distances and measured times; and calculating the position of a mobile transceiver in the network area using the determined relative time offsets.

The invention may comprise the further step of selectively preventing information concerning the position of a mobile transceiver from being available to that transceiver. In this way it would be possible to charge the mobile transceiver for the use of this information.

In a tenth aspect the invention provides a method of finding the position of a mobile radio-frequency transceiver in a communication system comprising a network of at least two base stations arranged to transmit signals at several different frequencies, comprising the step of: calculating the phase difference between the two or more signals having different frequencies that have been transmitted from the same base station in order to calculate its position.

In an eleventh aspect the invention provides a method of finding the position of a mobile radio-frequency transceiver in a communication system comprising a network of at least two base stations arranged to transmit/receive signals, comprising the step of: calculating the impulse response of the channel and using this information in the mobile transceiver to reduce multi-path effects.

In a twelfth aspect the invention provides a method of finding the position of a mobile radio-frequency transceiver in a communication system comprising a network of at least three base stations arranged to transmit signals, comprising the step of: synthesising a wide aperture while the mobile transceiver is moving to provide additional information for position calculation.

In a thirteenth aspect the invention provides a method of finding the position of a mobile radio-frequency transceiver in a communication system comprising a network of at least three base stations arranged to transmit signals, comprising the step of: synthesising a wide aperture while the mobile transceiver is moving to provide additional information to reduce multi-path effects.

In a fourteenth aspect the invention provides a method of finding the position of a mobile radio-frequency transceiver in a communication system comprising a network of at least three base stations arranged to transmit signals, comprising the step of: using a directional antenna, either at base station or on a mobile transceiver, for position ambiguity resolution, position determination or to reduce multi-path effects.

In a fifteenth aspect the invention provides a method of finding the position of a mobile radio-frequency transceiver in a communication system comprising a network of at least three base stations arranged to transmit/receive signals, comprising the step of: using Doppler estimates of the velocity of mobile transceivers to calculate the position or location of the mobiles.

In a sixteenth aspect the invention provides a method of finding the position of a mobile radio-frequency transceiver in a communication system comprising a network of at least three base stations arranged to transmit/receive signals, comprising the step of: using information such as map data, dead reckoning, communications broadcasts to improve mobile transceiver position estimates.

The system could also include a means of encrypting the signals transmitted between the base stations and mobile and reference receiver to safeguard privacy.

In one embodiment of this aspect, the network preferably comprises a cellular telephone network with the mobile transceiver comprising a cellular mobile telephone. The mobile telephone preferably operates under the GSM standard or the system based on GSM used in the United States of America.

A possible architecture of the invention, when relying on a remote hyperbolic tracking system, could consist of each base station having multiple receptor modules, one for each frequency being used in that region. The modules that do not correspond to the frequencies being used by a particular base station cell could listen to the mobile transceivers in other cells, measure the time of arrival of those signals, and pass those measurements to the control means for processing. Alternatively, the base station receivers could incorporate a pre-amplifier and one or a series of digital signal processors to simultaneously process the information received.

BRIEF DESCRIPTION OF THE DRAWINGS

By way of example only, embodiments of the invention will be described with reference to the accompanying drawings, in which.

BEST MODE OF CARRYING OUT THE INVENTION

Figure 1:
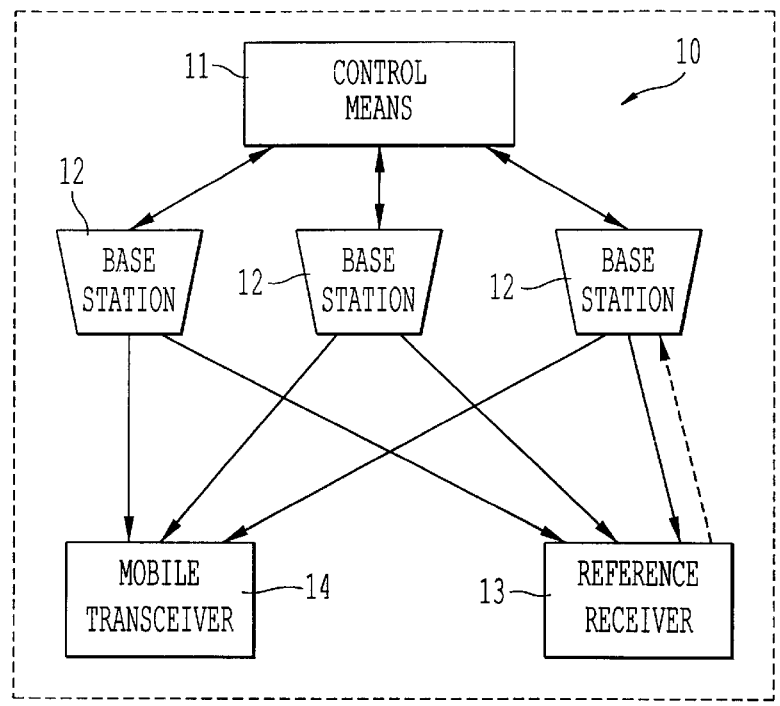
FIG. 1 is a system block diagram of one embodiment of the system architecture for a mobile cellular telephone communication system adapted to allow determination of the location of telephones using the system.

One embodiment of a direct hyperbolic self-positioning system architecture for a mobile cellular telephone communication system is depicted generally as 10 in FIG. 1. While the following discussion is directed to this system architecture, the system architecture, receiver architecture and algorithms can be easily adapted for the different modes of operation referred to in this specification.

The communication system 10 comprises a control means 11 at some central site, a plurality of base stations 12 which broadcast radio-frequency signals, a reference receiver 13 fixed relative to the base stations 12 and a mobile radio-frequency transceiver (ie. a cellular telephone) 14 which is using the communication system 10 to accurately determine its position. If the direct positioning system mode is used, then there will be a need to synchronise the various base stations.

As the reference receiver 13 is in a fixed position relative to the base stations 12, the propagation time of the radio-frequency signal from each base station 12 to the reference receiver 13 is known. Such a receiver can be used to measure the relative timing offsets of each base station (transmitter) and thereby achieve a form of synchronisation suitable for position determination. The following algorithm describes a method by which this can be achieved.

Suppose at time $t_0$ each of the base stations is meat to start the epoch of the transmission (in the case of GSM, slot 0), however base station A is $\tau_A$ seconds late, base station B is $\tau_B$ late and base station C is $\tau_C$ late. Now if the distance of the reference receiver from base stations A, B, and C is respectively $\xi_A$, $\xi_B$, and $\xi_C$ and the signals are received at the reference receiver at $t_A$, $t_B$, $t_C$ respectively, then the TDOA of the signals from A and B at the reference receiver will be $$T_{BA}=t_B-t_A$$

$$T_{BA}=t_0+\tau_B+\xi_B/c-(t_0+\tau_A+\xi_A/c)$$

where c is the speed of light, or $$T_{BA}=(\tau_B-\tau_A)+(\xi_B/c-\xi_A/c).$$

The second group of terms is a function of geometry, and so can be calculated as the exact location of the reference mobile and the base stations is fixed and can be accurately measured using Differential GPS (DGPS) or an equivalent system.

Similarly we have that $$T_{CA}=t_C-t_A$$

$$T_{CA}=(\tau_C-\tau_A)+(\xi_C/c-\xi_A/c).$$

Accordingly, by making precise measurements at the reference site, the relative time offsets of each of the base stations can be established. This offset can be broadcast to the mobiles, which can then make the appropriate adjustments to their time delay on arrival (TDOA) measurements. This concept may appear similar to the concepts used to broadcast DGPS corrections but it is significantly different. DGPS corrections are used to compensate for deterministic errors due to intentional (Selective Availability) and propagation related signal degradation. The proposed transmissions are corrections to compensate for timing offsets amongst the different transmitters.

In operation, the base stations 12, under the control of the control means 11, broadcasts signals for reception by the reference receiver 13 and mobile transceiver 14.

The reference receiver 13 detects the signals broadcast from each of the base stations 12 and determines the actual propagation time of the signal from each base station 12. The reference receiver then compares the actual propagation time with the expected reference propagation time. Any variation provides a measure of the timing errors, including the synchronisation difference, between the outputs from the plurality of base stations 12. Corrections are then communicated back to the control means 11 by the reference receiver 13 through its nearest base station 12 (see dashed arrow in FIG. 1).

The corrections provided to the control means 11 are in turn communicated back to all the base stations 12 and broadcast to the mobile transceivers 14 authorised to use the communication system to determine their position.

The mobile transceivers 14 receive correction information broadcast by the base stations 12. The transceivers 14 further have a signal processing means that allows them to measure the difference in the propagation time of the signal from each base station 12 to the mobile transceiver 14. Using this information, the signal processing means in each transceiver is able to calculate the position of the mobile transceiver using a hyperbolic self-positioning mode of operation. The signal processing means then adjusts its calculation to account for the errors masking use of the corrections communicated from the control means 11.

The cellular operator may deliberately degrade the synchronisation. Alternatively, the information broadcast from the reference receiver could be deliberately degraded. The signals are deliberately de-synchronised by the operator of the system 10 so as to prevent users of mobile telephones using the system 10 to communicate from determining their position without the authorisation of the system operator.

In this way, the system 10 ensures only those users of telephone transceivers 14 authorised to use the system 10 can accurately determine their positions.

Sometimes, not all the base stations in a system can be seen from one reference site. In this case several reference mobiles would be used. As long as there is an overlap between the base stations "seen" by the mobile, it will be possible to achieve system wide synchronisation.

Additional information may also be sent to the transceivers to improve the overall performance of the system. For example, data on the stability of the basestation oscillators or the location of the basestations could be transmitted. In such a system, the transceiver would model the drift of the timing offsets using the transmitted parameters and in this manner, the net data rate would be reduced as updates of the timing offsets could be less frequent.

Figure 2:
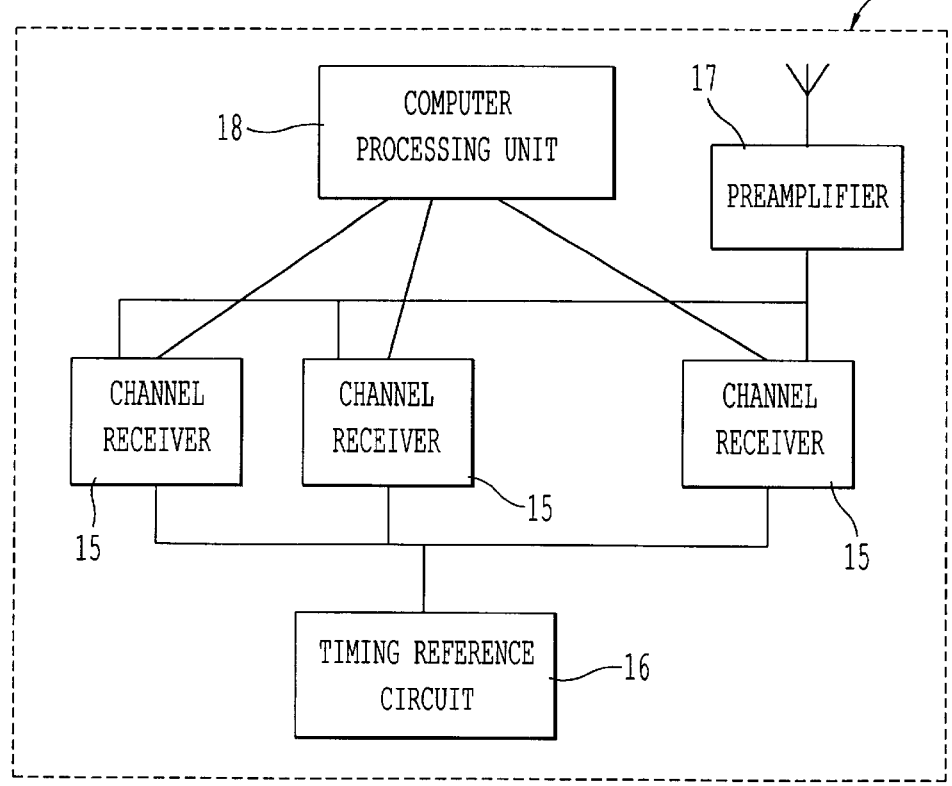
FIG. 2 is a block diagram of one embodiment of the radio-frequency receiver according to the present invention.

One possible receiver structure is depicted in FIG. 2. The transceiver 14 comprises a plurality of parallel channel receivers 15 each set up to receive a signal at a particular frequency and inter-connected to a timing reference circuit 16. Signals received by the transceiver 14 pass through a pre-amplifier 17 and into the channel receivers 15. A computer processing unit 18 in the receiver 14 measures the actual propagation time of the signal from each base station 12.

An alternative structure for the mobile transceiver 14 is to use a single channel receiver and switch it through different frequencies. A similiar approach can be used in the construction of the reference receiver 13.

In a fully utilised mobile GSM system, each base station will be operating with a number of frequencies. As well it will often be possible to pick up more than three base stations. This means that there will be considerable additional information which will make it possible to use carrier phase information to considerably improve the accuracy of the system.

For example, in a fully deployed FDMA system, each basestation will simultaneously broadcast on a number of different frequencies or channels. The mobile positioning transceiver will initially calculate the phase difference between two different channels that are located at the same physical location. Initially, the two channels that are furthest apart in frequency should be chosen. This difference frequency will have a much longer wavelength than the normal wavelength of the mobile telephone carrier frequency so a measurement of phase will not have nearly as many ambiguities. Indeed if the cell size is small and the difference wavelength is large, then it might be possible to unambiguously identify the distance to the basestation. For example, if the channels are 200 kHz apart, the wavelength will be 1500 meters, which would be sufficient to uniquely identify location if the cell size was 1000 meters. However, in practice the difference wavelength might be smaller, say 350 meters, so there will be a number of possible distances. Each distance will generate a circular locus around the basestation. The same procedure can then be carried out on another two basestations. This will generate three sets of annular circles. The point where three of the circles meet indicates the true location. In certain circumstances, eg. noise measurements or certain geometries, there may be a number of possible such intersections. In this case, if other channels are available, then the difference phase for these other channels can be calculated, new circular annul) generated and used to identify correct intersection. As well, if other channels are available, then the accuracy of this technique can be improved by calculating the phase difference between all combinations of channels and combining the estimates using standard statistical techniques.

In certain circumstances it may be possible to estimate location only using the channels from two basestations. This can be done by using prior information to reject some of the possible intersections. On the other hand, the more basestations that are used, the more accurate the technique, so that if channels from more than three basestations can be received then this information can be combined in a statistically optimal manner.

The above describes the basic self-positioning algorithm. There are many variations of the possible above, including using optimal statistical estimation techniques, or measuring the phase differences of the channels attached to a single basestation and then combining the annular range estimates so obtained from several basestations in order to make a position estimate.

Another important aspect of this approach is that it is possible to use the normal signal, thus there is no need to transmit a pilot carrier tone or other special signal. This is done by stripping the modulation from the signal using standard techniques and measuring the phase relationship of the quadrature channels. However, if as part of the normal modulation, there are periods when pure tones are transmitted, then this part of the signal can also be employed.

For optimal operation, all channels attached to the same basestation need to be phase locked. This is often the case, with the channels locked to the same frequency reference signal. If it not the case, then it is possible to monitor the phase difference between different channels and broadcast this information.

Reflections from buildings and other objects mean that in urban and suburban areas, the signal arriving at the mobile is distorted by multi-path effects. Cellular location systems, when measuring TDOA, typically do not properly account for this multi-path. Indeed these systems tend to measure the "centre of mass of the signal" rather than the first arrival.

There are a number of ways to reduce the effect of multi-path, however these can be computationally very expensive. Most modern cellular systems carry out equalisation. In normal operation, equalisation techniques do not reduce multi-path, because the algorithms are concerned with reconstituting all the energy in the signal. However, as part of the equalisation process, an estimate is formed of the impulse response of the channel. This impulse response gives the amplitude and delay of each arrival, including the first arrival. Accordingly it can easily be used to reject the late arrivals.

Given that the equalisation process is already carried out in the receiver, this technique of multi-path rejection may be more efficient than other methods that do not take into account the nature of mobile telephone systems.

Other techniques to reject the multi-path effects include the tracking of individual sources of multi-path and then subtracting them from the signal or a GSM equalisation process could be modified with the aim of subtracting out late arrivals.

In a preferred arrangement, the process for rejecting signals that have undergone multi-path reflections is as follows: the equaliser of the mobile telephone signal is interrogated to discover the equaliser's estimate of the impulse response. This estimate of the impulse response of the channel can be used to reject the delayed multipath signals. One way of doing this is shown below.

Suppose that the transmitted signal is u(t). Due to multi-path reflections, this signal will be distorted so that the received signal y(t) will be:

$$y(t)=u(t) * g(t).$$

where g(t) is the impulse response of the channel; and * denotes convolution.

Now let us divide y(t) into two parts, the first part due to the first signal that arrives and the second part due to multi-path reflected signals. Accordingly:

$$y(t)=u(t)+m(t)$$

where m(t) is the late arriving signals.

Using the Fourier transform, we have that $$Y(f)=U(f)+M(f)=U(f)G(f).$$

Accordingly:

$$M(f)=U(f)(G(f)+1).$$

Now a normal GSM receiver, as part of the equalisation process, will estimate G(f). This estimate can be used to calculate M(f) and so m(t). Finally, the system estimate of the first arrival will be:

$$u'(t)=y(t)-m'(t),$$

where m'(t) is the system estimate of m(t).

This estimate can then be used to recover the timing information by the process of matched filtering and demodulation. The above example applied to a continuous estimate of the impulse response. Often mobile telephone systems will derive a discrete estimate in which case the details of the above analysis will vary, but the basic argument will hold ie the output of the equaliser can be use to reject multipath.

In a remote positioning system it is important to safeguard privacy, and suitable encryption techniques may be employed.

Another important application will be the use of the positioning data in order to deduce traffic conditions. In particular, Doppler measurement of velocity could be used to augment vehicle position information by allowing a more accurate estimate of traffic speed at a particular location, as well as working out which side of the road the traffic is travelling on. This latter application would also be most useful for locating drivers in distress.

When a vehicle is moving, it is possible to use the movement of the vehicle to produce a synthetic antenna aperture, that can be many wavelengths across. This aperture could be then used for multi-path rejection by steering the antenna towards the base station and also as an added source of position information by determining the angle of arrival of the signal. In order for this system to work it is necessary to know the velocity of the vehicle. This could be determined from onboard sensors, or deduced from Doppler information.

It is possible to use directional antennas, both on the mobiles and on the base stations, to improve multi-path performance, resolve ambiguity, and increase accuracy. Some cellular positioning systems eg. GSM use directional antennas to divide areas into sectors and advantage can be taken of this division. Although the beam width of these sectors are not sufficiently narrow as to allow accurate positioning, under certain circumstances, they could be useful for resolving ambiguity relating to the multiple intersection of hyperbola or circles in hyperbolic or circular positioning systems respectively.

In the future, to allow greater capacity, there is consideration of using much narrow beamwidths in mobile systems. These narrower beamwidths can be used for locating mobiles, multi-path rejection, as well as ambiguity resolution.

In order to optimally process the data, it is desirable to process the Doppler estimates of vehicle velocity together with the estimates of position in order to calculate the location and velocity of the vehicle. Our approach is to use a Kalman filter. Such Kalman filters have been applied successfully to other positioning systems, such as the GPS. However this approach will not work for cellular positioning, because the mobile phase locks to the frequency of its home basestation. This means that the Doppler estimates will be inaccurate. We have developed a method to estimate the Doppler as if the mobile was not frequency locking. This corrected Doppler information can be used in a number of ways, including applying the information to a Kalman filter to filter the position and Doppler information. The method we have developed is as follows:

1) First use other techniques (such as time difference of arrival) to work out the approximate location of the mobile.

2) Measure the Doppler shift corresponding to each basestation. Denote $\delta(i)$ as the Doppler shift from the ith basestation. Assume the signal is picked at n basestations, and assume without loss of generality that the first basestation is the one that the mobile is frequency locked to. Then we have that $$\delta(1)=0$$

$$\delta(2)=v \cdot r_i f_0/c - v \cdot r_i f_0/c \; i=2, \ldots, n$$

where v is the velocity of the mobile, $r_i$ is the direction cosine to the $i^{th}$ basestation, $f_0$ is the carrier frequency, an c is the speed of light. These equations generate two unknowns (the x and y components of velocity) with n−1 equations. This can be solved provided n>=3. In order to make a position measurement, it will often be the case that n>=3. If n=3, the equations can be solved by matrix inversion, for n>3, least squares or some other optimal statistical method can be employed.

There are a number of ways to improve the performance of a cellular positioning system by integrating information from a number of other sources. Three possible sources are explained below:

In order to aid the positioning process it is possible to use map data. This can be done either with a map database system in a central site, or a map database in a vehicle. The simplest algorithm would be to move the measured position to the nearest road. However more sophisticated algorithms are possible.

Even with a large number of base stations within a city, there will be some regions where a position measurement is not possible. This is a problem with all radio based positioning systems, including GPS. One way to overcome this difficulty is to integrate a dead reckoning sensor into the system, so that in areas where there is no radio reception, the dead reckoning sensor could provide a position measurement.

The use of a combined GPS (or some other satellite positioning system) and a cellular positioning system would work well both in urban areas, where cellular systems have an advantage, and rural areas where GPS has an advantage.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A mobile radio-frequency communication system, comprising:

a network of at least two base stations arranged to transmit the same signals to at least one mobile radio-frequency transceiver, and receive signals from the one or more mobile radio-frequency transceivers;

a reference receiver located at a fixed location a known distance from each of the base stations and including measuring means to measure the times of arrival of signals transmitted from the base stations;

determination means to use the known distances and measured times to determine the relative time offsets of transmissions from each base station; and location means to use the determined relative time offsets to calculate the position of a mobile transceiver in the network area using techniques involving comparison of the times of arrival of signals from the base stations at the mobile transceiver;

wherein the mobile transceiver calculates the impulse response of the channel and uses this information to reduce multi-path effects.

2. A mobile radio-frequency communication system, comprising:

a network of at least two base stations arranged to transmit the same signals to at least one mobile radio-frequency transceiver, and receive signals form the one or more mobile radio-frequency transceivers;

a reference receiver located at a fixed location a known distance from each of the base stations and including measuring means to measure the times of arrival of signals transmitted from the base stations;

determination means to use the known distances and measured times to determine the relative time offsets of transmissions from each base station; and location means to use the determined relative time offsets to calculate the position of a mobile transceiver in the network area using techniques involving comparison of the times of arrival of signals from the base stations at the mobile transceiver;

wherein the mobile transceiver synthesizes a wide aperture while it is moving to provide additional information for position calculation.

3. A mobile radio-frequency communication system, comprising:

a network of at least two base stations arranged to transmit the same signals to at least one mobile radio-frequency transceiver, and receive signals from the one or more mobile radio-frequency transceivers;

a reference receiver located at a fixed location a known distance from each of the base stations and including measuring means to measure the times of arrival of signals transmitted from the base stations;

determination means to use the known distances and measured times to determine the relative time offsets of transmissions from each base station; and location means to use the determined relative time offsets to calculate the position of a mobile transceiver in the network area using techniques involving comparison of the times of arrival of signals from the base stations at the mobile transceiver;

wherein the mobile transceiver synthesizes a wide aperture while it is moving to provide additional information to reduce multi-path effects.

4. A method of finding the position of a mobile radio-frequency transceiver in a communication system comprising a network of at least two base stations arranged to transmit the same signals, comprising the steps of:

locating a reference receiver at known distances from the base stations;

measuring the times of arrival at the reference receiver of signals transmitted from the base stations;

determining the relative time offsets of transmissions from each base station, using the known distances and measured times; and calculating the position of a mobile transceiver in the network area using the determined relative time offsets;

said method comprising the additional step of calculating the impulse response of the channel between a base station and a mobile transceiver and using this information in the mobile transceiver to reduce multi-path effects.

5. A method of finding the position of a mobile radio-frequency transceiver in a communication system comprising a network of at least two base stations arranged to transmit the same signals, comprising the steps of:

locating a reference receiver at known distances from the base stations;

measuring the times of arrival at the reference receiver of signals transmitted from the base stations;

determining the relative time offsets of transmissions from each base station, using the known distances and measured times; and calculating the position of a mobile transceiver in the network area using the determined relative time offsets;

said method comprising the additional step of synthesizing a wide aperture while the mobile transceiver is moving to provide additional information for position calculation.

6. A method of finding the position of a mobile radio-frequency transceiver in a communication system comprising a network of at least two base stations arranged to transmit the same signals, comprising the steps of:

locating a reference receiver at known distances from the base stations;

measuring the times of arrival at the reference receiver of signals transmitted from the base stations;

determining the relative time offsets of transmissions from each base station, using the known distances and measured times; and calculating the position of a mobile transceiver in the network area using the determined relative time offsets;

said method comprising the additional step of synthesizing a wide aperture while the mobile transceiver is moving to provide additional information to reduce multi-path effects.

* * * * *